United States Patent Office

3,488,710
Patented Jan. 6, 1970

3,488,710
PROCESS OF BAKING USING SULFOSUCCINATES AND SULFOSUCCINAMATES
Kenneth Whelan, Chester, N.Y., assignor to American Cyanamid Company, Stamford, Conn., a corporation of Maine
No Drawing. Filed Aug. 7, 1967, Ser. No. 658,627
Int. Cl. A21d *13/00, 2/28, 13/08*
U.S. Cl. 99—86                                10 Claims

ABSTRACT OF THE DISCLOSURE

Bread and similar baked goods are prepared with a flour mix in which part or all of the conventional softener, a monoglyceride, is replaced by small amounts of a wetting agent of the sulfosuccinate or sulfosuccinamate type. Preferably, sodium di(ethylhexyl) sulfosuccinate is used. The range is quite critical, being between 10 and 150 p.p.m. of the wetting agent. An increased rate of hydration with longer moisture retention and a reduced viscosity of dough is obtained, which permits increase in output and which increases the equality of bread or other bakery goods after storage. Economy is also obtained by replacing glycerides with the sulfosuccinate. Best results are obtained in a range between 25 and 100 p.p.m.

Background of the invention

It has been proposed in the past to add a sodium sulfosuccinate, sodium di(ethylhexyl)sulfosuccinate, to the flour mix for bread baking. The amounts used based on the flour were from 600 p.p.m. up to 2400 p.p.m. These tests are described in an article by Swanson and Johnson in Cereal Chemistry, colume 21, pages 222–232. Longer mixing time was achieved, but the quality of the bread is described, the dough being described as "bucky" and "putty-like." As a result, sulfosuccinates have not been used practically in the baking industry. The larger amounts of sulfosuccinate also impart an undesirable bitter taste to the bread.

While baked goods of excellent quality can be produced, it is desirable to increase the through-put of dough in mixing equipment, reduce the critical dependence on mixing conditions, and improve keeping qualities, for example moisture content after keeping for a number of days.

Summary of the invention

The present invention is based on the discovery that if sulfosuccinate wetting agents are used in very much smaller amounts, between 10 and 150 p.p.m., it is possible to replace part or all of the customary monoglyceride softening agent and increase through-put, decrease critical dependence on mixing speeds and times, and improve the quality of goods on storage. Similar improved results are also obtained with a typical sulfosuccinamate wetting agent.

The process of the present invention produces bake goods which when freshly baked are equal in quality to standard fine baked goods with the customary monoglyceride softening agent or in some cases slightly improved quality. In other words, the advantages of greater through-put and better keeping qualities are obtained with no sacrifice in quality of the freshly baked goods. The present invention may, therefore, be thought of as a process for producing high quality bake goods, in many cases with improved keeping qualities, and at a higher through-put with reduced critical dependence on exact mixing speeds and times. This is a practical improvement and does not produce freshly baked goods which are markedly superior to the best that can be baked at the present time. However, the practical baking improvements and economics are obtained without any loss in quality of the product when freshly baked.

The preferred wetting agent is sodium di(ethylhexyl)-sulfosuccinate, which has the advantage of excellent process improvement associated with ready availability at a moderate price, for this wetting agent is produced in enormous quantities for various industrial and other uses, and also has the advantage of approval for use in foods. The invention, however, is not limited to the use of this particular sulfosuccinate, which is normally referred to in the industry by the more general term "dioctylsodiumsulfosuccinate," which will be used throughout the specification. Other sulfosuccinates, such as the dihexyl and diamyl compounds, are equally useful, and excellent results are also obtained with typical succinamates, such as tetrasodium N-(1,2-dicarboxyethyl)-N-octa-decylsulfosuccinamate.

Each flour mix type usually has an optimum mixing speed, which will vary somewhat from one type of flour to another. Ordinary mixes using monoglycerides as the softening agent are quite sensitive to mixing speeds and show inferior results in bread grain and texture when mixed for too short or too long a time. When the wetting agents of the present invention are used as part or all of the softening material in the ranges required by the present invention, a considerable variation in mixing speed can be employed without any adverse effect on the resulting baked goods.

Although ordinary baked goods under optimum conditions are of high quality when freshly baked, they tend to dry out and to change some of their characteristics, such as compressibility, on storage. This has also been undesirable but has been considered an unavoidable characteristic of most baked goods. When the process of the present invention is used with amounts of the sulfosuccinates in the preferred range, products can be obtained which are equal in quality to standard goods when freshly baked but which do not dry out as much on storage and retain desirable characteristics. This is particularly noticeable with some cake mixes. It is thus an advantage of the present invention that the process, with its operating improvements of increased through-put and lack of sensitiveness to exact mixing speeds, are obtained at no loss in quality and in some cases with marked improvements in quality on storage. In other words, the process of the present invention does not involve a compromise, and its advantages are obtained with no offsetting disadvantages.

Description of the preferred embodiments

The invention will be illustrated by typical examples, which are comparative, and the resulting products are set out in accordance with standard scoring. It should be noted that while there is such a thing as a perfect score on the various characteristics of bread, high grade, freshly baked bread prepared under optimum conditions will not show a completely perfect theoretical score and, similarly, neither will breads in which the dough was mixed by the process of the present invention. In each example control products are set forth representing the best commercial practice, and it will be seen that the goods produced by the process of the present invention equal the best and occasionally show a slightly better score. In order to have comparable experimental data, all of the breads were made from the same flour mixes.

EXAMPLE 1

Representative standard breads were baked by several professional bakers by using the following formula:

| | | |
|---|---|---|
| Southwest bakers patent flour | kilos | 5 |
| Lard | grams | 150 |
| Milk solids | do | 100 |
| Acidulant | do | 6 |
| Yeast | do | 100 |
| Salt | do | 75 |
| Sugar | do | 400 |
| Monoglycerides | do | 1.25 |
| Water | do | 3450 |
| Potassium bromate (based upon flour weight) | p.p.m. | 60 |
| Potassium iodate (based upon flour weight) | p.p.m. | 15 |
| Arkady yeast food | grams | 25 |

The usual continuous bread-baking procedure was used. A brew was made of the yeast, salt, sugar, milk solids, yeast food and a portion of the water. The brew was allowed to ferment and then mixed with the rest of the ingredients. The mixing was done in a continuous mix process, using a mixer head speed of 170 r.p.m. at a normal through-put of 130 lbs. per hour. Bread was baked into individual loaves and reserved for scoring for various properties. This was designated control bread.

Using the above formula, the monoglycerides, which are the principal softening agents commonly used in bread, were reduced from 1.25 grams, as in the control, to 0.625 gram in this batch. In place of the monoglycerides there was added 125 mg. dioctylsodiumsulfosuccinate (equivalent to 25 p.p.m. based on the weight of the flour). This bread was designated "Bread A."

Another bake was done, again using one-half the quantity of the monoglycerides used in the control (0.625 gm.) and 250 mg. dioctylsodiumsulfosuccinate (50 p.p.m. based upon the flour weight). Bread baked from this formula was designated "Bread B."

The following scores were obtained from the control bread, and Breads "A" and "B," from which a portion of the monoglycerides had been removed. All scores were averages of the several batches baked in each of the designations. Scoring was done by professional bakers accustomed to judging bread qualities.

LOAF SCORES

| | Control | Bread "A" | Bread "B" | Perfect Score |
|---|---|---|---|---|
| Volume | 9 | 10 | 10 | 10 |
| Crust color | 2 | 2 | 2 | 2 |
| Break and shred | 3 | 3 | 3 | 3 |
| Total external | 14 | 15 | 15 | 15 |
| Slicing | 9 | 9 | 9 | 10 |
| Grain | 18 | 18 | 18 | 20 |
| Texture | 18 | 18 | 17 | 20 |
| Crumb color | 9 | 9 | 9 | 10 |
| Aroma, taste | 9 | 9 | 9 | 10 |
| Softness | 14 | 14 | 14 | 15 |
| Total internal | 77 | 77 | 76 | 85 |
| Total Score | 91 | 92 | 91 | 100 |

COMPRESSIBILITY RESULTS
[Comparing 0.25% Monoglycerides vs. 0.125% Mono. plus DSS]

| | 4th day | 5th day | 6th day | 7th day |
|---|---|---|---|---|
| Control (0.25% monoglycerides) | 67 | 63 | 57 | 55 |
| Bread "A" | 65 | 59 | 52 | 49 |
| Bread "B" | 66 | 61 | 56 | 56 |

It will be noted that the breads according to the present invention had scores as good or in one case slightly better than the control. The compressibility results also fell within satisfactory limits, showing excellent keeping qualities.

EXAMPLE 2

Twist rolls fruit topped

A series of bakes was planned to determine the effect of dioctylsodiumsulfosuccinate on a yeast raised twist roll with fruit topping. In each instance the amounts of flour, water, lard, yeast, sugar, salt and other ingredients remained constant. Monoglyceride was used as a softener at a level of 0.5% by weight of the flour. Controls were baked from three different batches of flour and scored on the average of five different bakings. Using the same formula with 0.5% monoglyceride in the mix, three further series of bakes using the same three different batches of flour were completed. Series A contained 25 p.p.m. dioctylsodiumsulfosuccinate in addition to the other ingredients. Series B contained 50 p.p.m. and Series C contained 100 p.p.m. Series A, B and C were then scored and judged against the control. The following results were obtained:

| | Control | Series A | Series B | Series C |
|---|---|---|---|---|
| Volume | 20 | 20 | 22 | 21 |
| Crumb grain | 22 | 21 | 22 | 21 |
| Crumb texture | 21 | 22 | 21 | 22 |
| Taste | 27 | 27 | 27 | 27 |
| Total | 90 | 90 | 92 | 91 |
| Compressibility 5th day | 31 | 30 | 32 | 35 |

While there was apparently no appreciable difference between the controls and the rolls with 25 p.p.m. of the sulfosuccinate when fresh from the oven, the rolls containing 50 and 150 p.p.m. showed better results when fresh than either the controls or those with 25 p.p.m. Further the compressibility studies showed that the 50 to 100 p.p.m. range produced better storage qualities after five days.

EXAMPLE 3

Twist rolls fruit topped

The same essential formula used in Example 2 was used in this series of bakes, with the quantity of monoglyceride in the control the same as before at 0.5% by weight of the flour. For the test series the quantity of monoglycerides was reduced to one-half of the controls. Series A was baked with 0.25% monoglyceride plus 25 p.p.m. dioctylsodiumsulfosuccinate. Series B was baked with 0.25% monoglyceride and 50 p.p.m. dioctylsodiumsulfosuccinate, and Series C was baked with 0.25% monoglyceride and 100 p.p.m. dioctylsodiumsulfosuccinate. The following scores were obtained from an average of 5 bakes for each series and from three different flours:

| | Control | Series A | Series B | Series C |
|---|---|---|---|---|
| Volume | 21 | 21 | 22 | 21 |
| Crumb grain | 22 | 22 | 22 | 22 |
| Crumb texture | 21 | 22 | 21 | 21 |
| Taste | 27 | 27 | 27 | 27 |
| Total | 91 | 92 | 92 | 91 |
| Compressibility 5th day | 31 | 28 | 29 | 31 |

From this series of bakes it is apparent that the use of 100 p.p.m. dioctylsodiumsulfosuccinate allows the baker to reduce the amounts of monoglycerides by one-half and still have a sweet roll as soft as the control after five days storage.

EXAMPLE 4

Bread was prepared as in Example 1 except that there was no monoglyceride. It was mixed with a mixer head speed of 185 r.p.m. and a normal through-put of 130 lbs. per hour. No dioctylsodiumsulfosuccinate was added to the bread. This is designated as the control bread and is scored below. Using the same formula and the same mixer head speed of 185 r.p.m. but with the through-put stepped up to 143 lbs./hour, the bread was baked and scored below as Bread "A." The same formula was used for Bread "B,"

but 100 p.p.m. of dioctylsodiumsulfosuccinate was added to the dough by mixing it with the shortening.

SCORES FOR BREAD BAKED WITH VARIABLE THROUGH-PUT

|  | Control | Bread "A" | Bread "B" | Perfect Score |
|---|---|---|---|---|
| Volume | 9 | 8 | 9 | 10 |
| Crust color | 2 | 2 | 2 | 2 |
| Bread and shred | 3 | 3 | 3 | 3 |
| Total external | 14 | 13 | 14 | 15 |
| Slicing | 9 | 9 | 9 | 10 |
| Grain | 18 | 12 | 17 | 20 |
| Texture | 18 | 14 | 18 | 20 |
| Crumb color | 9 | 9 | 9 | 10 |
| Aroma, taste | 9 | 9 | 9 | 10 |
| Softness | 14 | 14 | 14 | 15 |
| Total internal | 77 | 67 | 76 | 85 |
| Total Score | 91 | 80 | 90 | 100 |

Bread "A," produced from the identical formula of the control but with 10% increase in through-put, was not saleable because of the poorer volume, grain and texture. Addition of 100 p.p.m. of dioctylsodiumsulfosuccinate to the formula produced at a 10% increase in through-put a bread which was remarkably close to the control and was marketable.

EXAMPLE 5

Evaluation of dioctylsodiumsulfosuccinate in white cake

A standard white cake recipe was used. (Recipe based on Light-Golden Cake from Good Housekeeping Cook Book, 1955, p. 447). All ingredients were weighed Four cakes were baked, i.e., (1) control, (2) dioctylsodiumsulfosuccinate at 30 p.p.m., (3) dioctylsodiumsulfosuccinate at 60 p.p.m., (4) dioctylsodiumsulfosuccinate at 90 p.p.m. The dioctylsodiumsulfosuccinate level was based on the weight of the flour but was added to the shortening (Crisco). The dioctylsodiumsulfosuccinate also was pipetted on the weighed shortening (Crisco) and was incorporated into the solid fat by mixing with a stirring rod. No differences in mixing times during preparation of the cake batter were noted. The cakes were stored at room temperature, on plates, covered with a plastic formed cover. Judging was done by a panel of experts.

Storage tests

| Age: | Comments |
|---|---|
| Freshly baked | No significant differences. |
| 1 day | Very slight preference for the 60 p.p.m. and 90 p.p.m. over the control, which was slightly drier. No major differences. |
| 2 days | All very close. Possibly 60 p.p.m. most moist. |
| 5 days | Control most stable. 60 p.p.m. best and most moist. |
| 9 days | Samples (coded) evaluated at Rutgers University. Control had the toughest crumb. Others similar in crumb structure. |
| 15 days | Control and 30 p.p.m. comparable. Both quite dried out, hard crust, 60 p.p.m. and 90 p.p.m. comparable. Both still moist considering age. |

EXAMPLE 6

In order to show that addition of dioctylsodiumsulfosuccinate concomitantly with a reduction in monoglyceride produces a greater tolerance to mixing, the following experiment was performed:

Bread was baked as in Example 1 without any dioctylsodiumsulfosuccinate and with 0.5% monoglycerides as the softening agents. Three batches were baked using different mixer head speeds, and were scored as follows:

|  | R.p.m. 185 | R.p.m. 195 | Perfect Score |
|---|---|---|---|
| Volume | 10 | 8 | 10 |
| Crust color | 2 | 2 | 2 |
| Bread and shred | 3 | 3 | 3 |
| Total external | 15 | 13 | 15 |
| Slicing | 9 | 9 | 10 |
| Grain | 18 | 18 | 20 |
| Texture | 18 | ¹15 | 20 |
| Crumb color | 9 | 9 | 10 |
| Aroma, taste | 9 | 9 | 10 |
| Softness | 14 | 14 | 15 |
| Total internal | 77 | 74 | 85 |
| Total Score | 92 | 87 | 100 |

¹ Over mix.

Using the same dough formulation except reducing the monoglycerides to 0.25% and adding 50 p.p.m. dioctylsodiumsulfosuccinate by weight of the flour, three batches were run at different head speeds. These scored as follows:

|  | R.p.m. 185 | R.p.m. 195 | Perfect Score |
|---|---|---|---|
| Volume | 10 | 10 | 10 |
| Crust color | 2 | 2 | 2 |
| Break and shred | 3 | 3 | 3 |
| Total external | 15 | 15 | 15 |
| Slicing | 9 | 9 | 10 |
| Grain | 18 | 18 | 20 |
| Texture | 18 | 19 | 20 |
| Crumb color | 9 | 9 | 10 |
| Aroma, taste | 9 | 9 | 10 |
| Softness | 14 | 14 | 15 |
| Total internal | 77 | 78 | 85 |
| Total Score | 92 | 93 | 100 |

It will be noted that when the mixing speed was increased to 195 r.p.m. the bread prepared according to the present invention was actually slightly better than the control at the optimum mixing speed.

EXAMPLE 7

Using sodium dihexylsulfosuccinate instead of dioctylsodiumsulfoscuccinate

The standard formula used in Example 1 was used as a base except that 0.5% monoglycerides was used in the control and the experimental bread contained 0.25% monoglycerides plus 50 p.p.m. of sodium dihexylsulfosuccinate. With both the control and experimental bread, an optimum r.p.m. of 185 for the mixer head speed was found by trial and error. Bread baked according to these formulas were scored as follows:

|  | Control (0.5% Mono, No wetting agent) | Experimental Bread (0.25% Mono plus 50 p.p.m. sodium dihexylsulfosuccinate) | Perfect Score |
|---|---|---|---|
| Volume | 10 | 10 | 10 |
| Crust color | 2 | 2 | 2 |
| Break and shred | 3 | 3 | 3 |
| Total external | 15 | 15 | 15 |
| Slicing | 9 | 9 | 10 |
| Grain | 18 | 18 | 20 |
| Texture | 18 | 18 | 20 |
| Crumb color | 9 | 9 | 10 |
| Aroma, taste | 9 | 9 | 10 |
| Softness | 14 | 14 | 15 |
| Total internal | 77 | 77 | 85 |
| Total Score | 92 | 92 | 100 |

EXAMPLE 8

Using sodium diamylsulfosuccinate instead of dioctylsodiumsulfosuccinate

The standard formula used in Example 1 was used as a base except that 0.5% monoglycerides was used in the control and the experimental bread contained 0.25% monoglycerides plus 50 p.p.m. of sodium diamylsulfosuccinate. With both the control and experimental bread, an optimum r.p.m. of 185 for the mixer head speed was found by trial and error. Breads baked according to these formulas were scored as follows:

|  | Control (0.5% Mono, No. wetting agent) | Experimental Bread (0.25% Mono plus 50 p.p.m. sodium diamylsulfosuccinate) | Perfect Score |
| --- | --- | --- | --- |
| Volume | 10 | 10 | 10 |
| Crust color | 2 | 2 | 2 |
| Break and shred | 3 | 3 | 3 |
| Total external | 15 | 15 | 15 |
| Slicing | 9 | 9 | 10 |
| Grain | 18 | 18 | 20 |
| Texture | 18 | 18 | 20 |
| Crumb color | 9 | 9 | 10 |
| Aroma, taste | 9 | 9 | 10 |
| Softness | 14 | 14 | 15 |
| Total internal | 77 | 77 | 85 |
| Total Score | 92 | 92 | 100 |

EXAMPLE 9

Using tetrasodium N-(1,2-dicarboxyethyl)-N-octadecylsulfosuccinamate

The standard formula used in Example 1 was used as a base except that 0.5% monoglycerides was used in the control and the experimental bread contained 0.25% monoglycerides plus 50 p.p.m. of tetrasodium N-(1,2-dicarboxyethyl)-N-octadecylsulfosuccinamate. With both the control and experimental bread, an optimum r.p.m. of 185 for the mixer head speed was found by trial and error. Breads baked according to these formulas were scored as follows:

|  | Control (0.5% Mono, No. wetting agent) | Experimental Bread (0.25% Mono plus 50 p.p.m. the succinamate) | Perfect Score |
| --- | --- | --- | --- |
| Volume | 10 | 10 | 10 |
| Crust color | 2 | 2 | 2 |
| Break and shred | 3 | 3 | 3 |
| Total external | 15 | 15 | 15 |
| Slicing | 9 | 9 | 10 |
| Grain | 18 | 18 | 20 |
| Texture | 18 | 18 | 20 |
| Crumb color | 9 | 9 | 10 |
| Aroma, taste | 9 | 9 | 10 |
| Softeners | 14 | 14 | 15 |
| Total | 77 | 77 | 85 |
| Total Score | 92 | 92 | 100 |

What is claimed is:

1. A process of producing baked goods which comprises preparing a dough containing a monoglyceride softening agent in which at least a part of said softening agent is replaced by an amount of a wetting agent selected from the group consisting of dialkylsulfosuccinates and carboxyethylalkylsulfosuccinamates in an amount between 10 and 150 p.p.m. based on the weight of the flour and baking the dough.

2. A process according to claim 1 in which the wetting agent is sodium di(ethylhexyl)sulfosuccinate.

3. A process according to claim 1 in which the wetting agent is sodium di(hexyl)sulfosuccinate.

4. A process according to claim 1 in which the wetting agent is sodium diamylsulfosuccinate.

5. A process according to claim 1 in which the wetting agent is tetrasodium N-(1,2-dicarboxyethyl)-N-octadecylsulfosuccinamate.

6. A process according to claim 1 in which the amount of wetting agent is from 25 to 100 p.p.m.

7. A process according to claim 6 in which the wetting agent is sodium di(ethylhexyl)sulfosuccinate.

8. A process according to claim 6 in which the wetting agent is sodium di(hexyl)sulfosuccinate.

9. A process according to claim 6 in which the wetting agent is sodium diamylsulfosuccinate.

10. A process according to claim 6 in which the wetting agent is tetrasodium N-(1,2-dicarboxyethyl)-N-octadecylsulfosuccinamate.

References Cited

UNITED STATES PATENTS 2,492,588  12/1949  Marhofer _____ 99—91

OTHER REFERENCES

Swanson et al.: "The Effects of Some Wetting and Reducing Agents on the Mixing Time and on the Quality of Bread," Cereal Chemistry, vol. 21, pp. 222–232 (May 1944).

LIONEL M. SHAPIRO, Primary Examiner

J. R. HOFFMAN, Assistant Examiner

U.S. Cl. X.R.

99—91, 92